United States Patent [19]

Hwang

[11] 4,004,134
[45] Jan. 18, 1977

[54] OFF-LINE MAGNETIC CARD READER SYSTEM OPERABLE AS THOUGH NORMALLY ON LINE

[75] Inventor: Rong H. Hwang, Arcadia, Calif.

[73] Assignee: Rusco Industries, Inc., Los Angeles, Calif.

[22] Filed: June 17, 1975

[21] Appl. No.: 587,633

[52] U.S. Cl. .................. 235/61.7 R; 235/61.11 D
[51] Int. Cl.² ................... G06K 5/00; G06K 7/08
[58] Field of Search ............. 235/61.11 D, 61.7 B, 235/61.7 R; 340/149 A

[56] References Cited
UNITED STATES PATENTS

| | | | |
|---|---|---|---|
| 3,598,964 | 8/1971 | Dell | 235/61.11 D |
| 3,602,697 | 8/1971 | Tanaka et al. | 235/61.11 D |
| 3,686,479 | 8/1972 | Rogers et al. | 235/61.11 D |
| 3,780,268 | 12/1973 | Rogers et al. | 235/61.11 D |
| 3,859,508 | 1/1975 | Brosow et al. | 235/61.11 D |
| 3,896,292 | 7/1975 | May et al. | 235/61.11 D |

Primary Examiner—Daryl W. Cook
Attorney, Agent, or Firm—Perry E. Turner

[57] ABSTRACT

A card has two sets of magnetized spots, one set being readable by a reader in an on-line system, and the other set being readable by an off-line reader. Coupled to the off-line reader is a pulse generator adapted to develop pulses of the same character as "go" and "no-go" pulses generated by a station query and stored data comparison console in response to data from the on-line reader. A gate network normally keeps the console in communication with the on-line reader, but is operated to couple the pulse generator to the on-line reader when the console fails to query and cannot send command pulses. Also disclosed are timing devices for delaying operation of the output apparatus for a period corresponding to the time required for the normal on-line system operation to actuate such apparatus.

5 Claims, 1 Drawing Figure

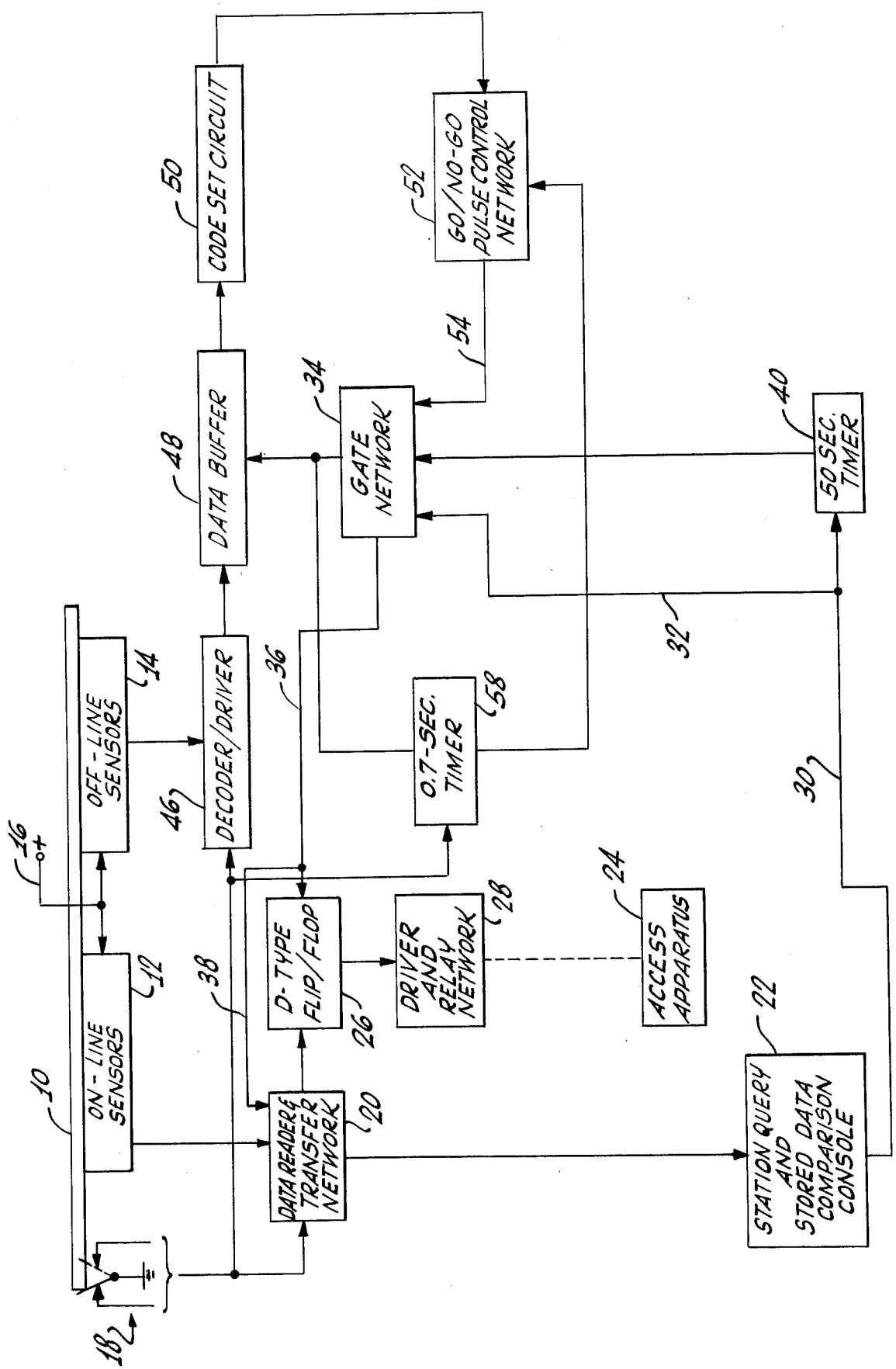

OFF-LINE MAGNETIC CARD READER SYSTEM OPERABLE AS THOUGH NORMALLY ON LINE

BACKGROUND OF THE INVENTION

1. Field of the Invention

This invention relates to static magnetic card readers and control systems for electrically operable apparatus, e.g., doors, turnstiles, printers, etc.

2. Discussion of the Prior Art

Static card readers are known which employ a plurality of stationary electromagnet sensors, and which are adapted to receive and hold a spot magnetized card. Sensor coils are pulsed to develop logic level signals representing the polarity distribution of the card spots, and hence the code of the card. See U.S. Pat. Nos. 3,686,479 and 3,885,130, assigned to the same assignee as the present application.

Where such readers are provided at various doors throughout a building, it is known to incorporate all readers into an on-line system wherein they are queried from a station query and stored data comparison console. When a card is inserted in a reader at a particular location, on the next query the code data in the card is transmitted to the console for comparison with stored data. If there is a match, the console transmits a "go" command pulse to the reader so as to enable it for energizing the relay or solenoid for the door strike at that location. If there is no match, a "no-go" signal is transmitted which may be the termination of a query pulse or equivalent wide pulse that prevents operation of logic circuitry to enable the reader for actuating the door strike.

Heretofore, when the console failed to operate in such a system, i.e., to query and send command pulses, the security represented by the system was completely lost. The fact of failure is instantly known, and it has been necessary for security personnel to man the different locations for identifying, and opening doors to permit entry of, authorized persons.

SUMMARY OF THE INVENTION

This invention embraces a system for operating an on-line magnetic card reader whenever the on-line controls fail, but in such a way as to make it appear that there is normal on-line operation. Included are means operable in the off-line situation to read particular spots of a card, to generate a "go" pulse of the same width as a "go" pulse from the console of the normal on-line system operation, to apply such simulated "go" pulse to the reader to cause it to enable logic circuit means for operating the access apparatus, and for generating and applying to the reader a simulated "no-go" command pulse to prevent such reader operation when the particular card spots are not present or are not of the proper polarity distribution. Also included in the scope of this invention is means for preventing application of a "go" pulse to the reader for a period corresponding to that which is required for the normal on-line system to effect actuation of the access apparatus.

BRIEF DESCRIPTION OF THE DRAWING

The lone FIGURE is a block diagram of the system of this invention.

DESCRIPTION OF PREFERRED EMBODIMENT

Referring to the drawing, a magnetic card 10 is provided for insertion in a housing (not shown) within which are a plurality of sensors. The card 10 is spot magnetized so that the poles of all spots are perpendicular to the card faces, and when the card is fully inserted in the housing each such spot is coaxial with a respective sensor. Sensors employed preferably are the type having a coil wound on a core of saturable material of high initial permeability requiring a sufficiently low magnetomotive force to saturate it that the spot of a card will effect such saturation. Se U.S. Pat. Nos. 3,686,479 and 3,717,749 assigned to the same assignee as the present application.

When a voltage pulse is applied to such a coil, the decay thereof is slower in the presence of an opposing spot field than the decay of a pulse in the presence of an aiding field. Via logic devices coupled to the coils, respective binary logic level outputs are derived for the aiding and opposing relations.

In the drawing, two sets of sensors are illustrated which are respectively labeled on-line sensors 12 and off-line sensors 14. Each sensor has one end of its coil connected to a voltage source as indicated at 16. The other ends of the coils are adapted to be connected to a point of reference or ground potential in a sequence desired, as determined by decoder or switching circuitry to which they are connected. In this latter regard, when the card 10 is fully inserted in the housing, the inner end of the card actuates the movable contact of a switch 18, shown as a single pole, double throw switch, the fixed contacts of which are connected to circuits for reading the sensor conditions.

The on-line sensors are connected to a data reader and transfer network 20 which is adapted to effect the pulsing of the sensors 12 and to transfer the data represented thereby to a station query and stored data comparison console 22. Such data reader is enabled upon actuation of the switch 18, and the data it obtains from the card 10 is transferred to the console 22 on being queried by the console.

As heretofore employed, such console is directly coupled to each of a plurality of data reader and transfer networks 20, and repeatedly transmits query pulses to them in succession. Each query pulse conditions the network to transfer to the console any data being read from a card that is in place. If there is no card, the query pulse terminates. If a card is in place, the first query pulse occurring after the card actuates the switch 18 is effectively expanded wherein a clock circuit is enabled and a multi-baud serial data stream is sent to the console. The serial transmission format comprises a start bit followed by serial data bits which represent the information encoded in the card.

If the console detects that the card code matches a stored code, the console transmits a "go" command pulse to logic circuitry for the purpose of causing access apparatus 24 to be actuated. In one example, the "go" command pulse occurs within the span of a clock pulse to cause a flip flop to be set and thereby effect operation of the driver and relay network 28 that actuates the access apparatus 24.

If the console detects that the card code does not match a stored code, the console transmits a "no-go" command pulse. Such a "no-go" pulse exceeds the duration of the clock pulse during which the flip flop is permitted to be set. The flip flop is accordingly not set, and the access apparatus is therefore not actuated.

In accordance with this invention, failure of the console to transmit query and command pulses does not cause shut down of security or indicate that normal on-line operation is not continuing. The D-type flip flop 26 illustrated is set so that the driver and relay network 28 and access apparatus 24 are operated in response to a valid card 10 whether the on-line system is functioning or not functioning.

In this regard, connection of the console 22 for querying and commanding purposes during on-line operation is via lines 30, 32 to a gate network 34, and lines 36, 38 to the flip flop 26 and to the data reader and transfer network 20. The gate network 34 is normally conditioned to maintain the connection between lines 32 and 36, 38. For this purpose, a timer 40, indicated as a 50-sec. timer, is also connected between the console 22 and the gate network 34. The timer 40 is normally on, and is reset by each query pulse from the console. The timer 40 in normal operation enables gate conditions in the network 34 to insure the direct coupling between the lines 32 and 36, 38.

If signals from the console 22 do not appear in line 30, e.g., as where the line 30 is cut, data in a valid card that is sensed via off-line sensors 14 is utilized to operate the access apparatus in the same manner as though commanded from the console. To this end, each card contains a predetermined number of spots which are aligned with respective off-line sensors. A decoder/driver network 46 is connected to the ends of the sensors 14 that are to be selectively connected to reference potential. In this regard, the fixed contacts of the switch 18 are also connected to logic circuitry in the decoder/driver 46, which functions as heretofore explained to develop logic level signals representing the polarity distribution and hence the code of the off-line card spots.

A data buffer 48 connected to the decoder/driver 46 is to have the data loaded therein. Such data buffer may be a conventional multi-bit shift register. As will be more fully explained below, the gate network 34 enables the data buffer to accept the data from the decoder/driver.

A code set circuit 50 is connected to the data buffer 48, and a go/no-go pulse control network 52 is connected between the code set circuit 50 and the gate network 34. The code set circuit 50 is adapted to be set or wired in accordance with one of the number of possible pattern combinations of the spots encoded for off-line purposes. For example, the card 10 may have four spots in addition to the regular on-line spots, and at a particular reader location the code set circuit 50 is set in conformance with the one of the sixteen possible patterns for which it is desired that the four spots have in cards that are to be used for access apparatus at that location.

The code set circuit may be conventional logic circuitry operable so that if the four inputs thereto in the present example are all correct, it develops one logic level output, e.g., a true or "1" output. If any input is incorrect, the code set circuit output is false or "0".

The pulse control network 52 is adapted to respond to the outputs of the code set circuit 50 to develop pulses of widths of the "go" and "no-go" pulses transmitted by the console 22 when in normal on-line operation. In one example, the console-generated "go" pulses are 1-millisecond pulses, and the console-generated "no-go" pulses are 60-millisecond pulses. In the pulse control network 52, the time constant may be set so that the wider "no-go" pulse is generated in response to a false output from the code set circuit 50. A true output from the code set circuit causes smaller resistance to be operable in parallel to that which provided the longer time constant, and thereby causes the narrower pulse to be generated.

When the query pulses from the console 22 fail to appear in line 30, the gate network 34 is made to function to effect direct coupling from the pulse control network 52 to the lines 36, 38. For this purpose, the timer 40 ceases operation at the end of the period set therefor following the last received query pulse. At the end of such period, gates within the network 34 which coupled lines 32 and 36, 38 are disabled, and gates are enabled which couple the line 54 from the pulse control network 52 to the lines 36, 38. Thus, command pulses continue to be supplied. Further, the gate network 34 also functions at such instant to enable the data buffer 48 so as to cause the data read by the decoder/driver to be loaded therein.

Desirably, transmission of pulses from the pulse control network 52 are delayed for a predetermined time corresponding to the period which the on-line system requires to operate the access apparatus in response to a validly coded card. In one example, the total time for the on-line system to respond to a card insertion and to complete actuation of a door strike is in the neighborhood of 0.7-sec. In accordance with this invention, 0.7-sec. timer 58 is provided which is rendered operable via connections thereto from the switch 18 and the gate network 34, and such timer via connection to the pulse control network 52 is effective to prevent transmission of pulses from such network to the data reader in network 20 and to the flip-flop 26 for the desired 0.7-sec.

Accordingly, persons using their validly coded cards to gain access at any location are not given any indication that the normal on-line system is not functioning. Meanwhile, suitable indicators at the console will have alerted those responsible for maintenance and repairs to take the necessary steps to discover the reason for the cessation of on-line operations and to restore the affected portions to their on-line condition.

I claim:
1. In combination:
means for receiving a card that is magnetized in a plurality of spots,
one predetermined spot pattern representing one set of data and a second predetermined spot pattern representing a second set of data;
an electrically operable device;
control means for said device;
logic circuit means coupled to said control means and adapted to be set to condition said control means for operating said device;
first means for detecting said first set of data from the card;
means responsive to the data detected by said first means to set said logic circuit means so as to condition said control means for operating said device;
means to detect inoperativeness of said setting means;
second means for detecting said second set of data from the card;
and means coupled to said inoperativeness detecting means and to said second means and responsive to the second set of data to set said logic circuit means so as to condition said control means for operating said device, upon detection of inoperativeness of said first-mentioned setting means.

2. A combination in accordance with claim 1, including gate means in said inoperativeness detecting means;
   stored data comparison means for comparing data stored therein with the data detected by said first detecting means,
   said gate means normally coupling said data comparison means to said first detecting means and logic circuit means,
   said data comparison means being normally operable to periodically interrogate said first detecting means for obtaining data therefrom for comparison with stored data,
   and to transmit a "go" signal for setting said logic circuit means only when the data from said detecting means matches stored data;
   and means in circuit with said data comparison means and said gate means for operating said gate means to decouple said data comparison means from said first detecting means and logic circuit means upon cessation of periodic interrogation of said first detecting means by said data comparison means.

3. A combination in accordance with claim 2, including signal developing means coupled to said second detecting means and to said gate means,
   said gate means being operable upon decoupling said data comparison means from said first detecting means and logic circuit means so as to couple said signal developing means to said first detecting means and logic circuit means, said signal developing means developing a signal of the same characteristic as said "go" signal in the presence of said second set of data.

4. A combination in accordance with claim 3, wherein said data comparison means, when operative, transmits a "no-go" signal to prevent setting of said logic circuit means when the data from said first detecting means does not match stored data;
   said signal developing means developing a second signal in the absence of said second set of data, said second signal being of the same characteristic as said "no-go" signal developed by said data comparison means.

5. A combination in accordance with claim 4, wherein the operation of said device under control of said data comparison means follows a predetermined period after reception of a card containing a spot pattern representing data that matches stored data, and including time delay means coupled to said signal developing means and gate means,
   said time delay means being operable upon cessation of said periodic interrogation, and following insertion of a card containing a spot pattern representing the second set of data, to prevent application to said logic circuit means of the setting signal from said signal developing means for a period corresponding to said predetermined period.

* * * * *